Figure 4:
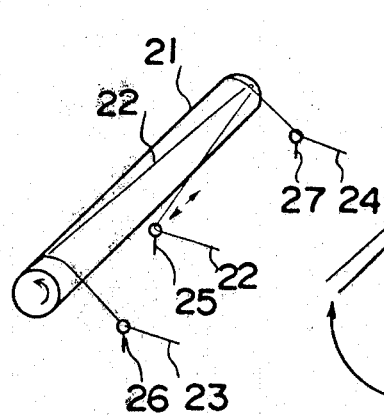

United States Patent [19]

Taniyama et al.

[11] 4,336,138
[45] Jun. 22, 1982

[54] PERMEATION SEPARATION APPARATUS

[75] Inventors: Tsukasa Taniyama; Masaaki Sekino; Michimasa Kishimoto, all of Otsu, Japan

[73] Assignee: Toyobo Co., Ltd., Japan

[21] Appl. No.: 885,411

[22] Filed: Mar. 10, 1978

Related U.S. Application Data

[63] Continuation-in-part of Ser. No. 708,970, Jul. 26, 1976, abandoned.

[30] Foreign Application Priority Data

Jul. 26, 1975 [JP] Japan .................................. 50/91446
May 26, 1976 [JP] Japan .................................. 51/61602

[51] Int. Cl.$^3$ ....................... B01D 31/00; B29C 27/14
[52] U.S. Cl. .................................. 210/321.4; 55/158; 210/433.2
[58] Field of Search .................. 210/321 R, 497.1; 156/169, 172, 175, 180; 55/158

[56] References Cited

U.S. PATENT DOCUMENTS 3,422,008  1/1969  McLain .................. 210/497.1 X
3,455,460  7/1969  Mahm et al. .............. 210/497.1
3,536,611  10/1970 Filippi et al. ............. 210/321 X
3,755,034  8/1973  Mahm ...................... 156/169
3,794,468  2/1974  Leonard ................... 210/497.1

FOREIGN PATENT DOCUMENTS 2242129  8/1974  France ........................... 210/321 B Primary Examiner—Theodore A. Granger
Attorney, Agent, or Firm—Jones, Tullar & Cooper

[57] ABSTRACT

A permeation separation apparatus furnished with an assembly consisting essentially of a multiplicity of continuously hollow fibers which have a selective permeability to fluid, said hollow fibers being arranged on the surface of a core so as to constitute multiple layers of the hollow fiber lines wherein the hollow fiber lines are disposed in mutually and up- and downwardly intersecting relations and are crossed two or more layers, said each layer having a thickness equal to the diameter of a piece of hollow fiber, with a resin wall or resin walls provided at one terminal or at both terminals of said hollow fiber layers, each of said hollow fiber lines thrusting through at least one of said resin walls in a fluid-sealing condition to provide an opening outward, and said hollow fiber being disposed so as to satisfy the formula:

$$\pi D/10L \leq \tan B \leq 3\pi D/4L \quad (I)$$

wherein B is an angle between a line of said hollow fiber and a straight line which is parallel with the central axis of said core on the surface of a cylindrical body which includes said hollow fiber and has common central axis with said core; D is a diameter of said cylindrical body; and L is a length of said hollow fiber layer in an axial direction.

3 Claims, 11 Drawing Figures

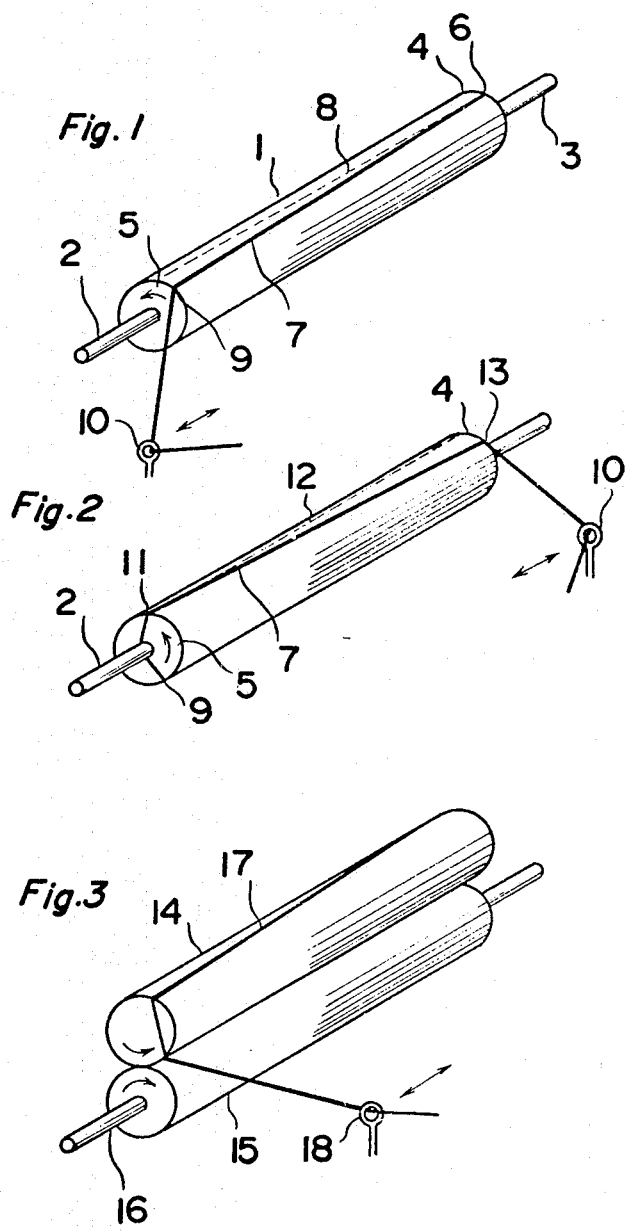

PERMEATION SEPARATION APPARATUS

This application is a continuation-in-part application of U.S. Ser. No. 708,970, filed on July 26, 1976, now abandoned.

The present invention relates to a permeation separation apparatus with hollow fibers of which the membrane walls have a selective permeability to fluid.

In recent years, as a method of separating some components from the fluid mixtures consisting of various components, there has specially been noted a membrane permeation process which utilizes the membranes which have a selective permeability. Such a process has already been in practical use in a certain field. As the kinds of the membrane permeation process, there are gas permeation, liquid permeation, dialysis, ultrafiltration, and reverse osmosis. The membrane permeation process is usually applied to desalination of sea water, desalination of brackish water, purification of various kinds of waste water, refining of protein, separation of water from oil, artificial kidney, artificial lung, separation of helium from natural gas, and the like.

There have hitherto been made many proposals on the permeation separation apparatuses utilizing hollow fibers, for example, (1) Japanese Patent Publication No. 28625/1964, (2) Japanese Patent Laid Open Publication (unexamined) No. 8595/1972 and (3) Japanese Patent Publication No. 5153/1975. However, these have various defects as mentioned below.

(1) Japanese Patent Publication No. 28625/1964 discloses a construction to contain in a cylindrical case a bundle of hollow fibers disposed in parallel relation one another in an axial direction. This system is defective in that, because of the arrangement of the hollow fibers in mutually parallel relations, the constituent hollow fibers contact one another when exposed to a flow of fluid, and the apparatus has a small effective membrane area. Additionally, due to the parallelism between the direction of flow of fluid and the direction of arrangement of hollow fibers, the apparatus is apt to cause the flow of fluid uneven to include locally the areas where the flow rate is extraordinarily small, leading to a lowering of the permeation capacity of the apparatus by a concentration polarization phenomenon.

(2) Japanese Patent Laid Open Publication (unexamined) No. 8595/1972 shows a construction to contain in a cylindrical case a columnar assembly of hollow fibers formed by coiling around dispersion tube a sheet of thin porous substance to which hollow fibers are fixed, like a roll cake. This construction provides an improved evenness of flow of the fluid to be treated, but has a defect in that, because of a large number of porous substances disposed between the layers of the hollow fibers, the apparatus has a relatively small packed density of the hollow fibers and is liable to cause clogging of pores by the solids contained in the flow. Also, because of nearly parallel arrangement of the hollow fibers, the constituent hollow fibers contact one another in a flow of fluid to cause an inevitable loss of effective membrane area. Further, according to this system, a large-scale apparatus is required for assembling a hollow fiber assembly, and a direct connection of the hollow fiber spinning process with the process for assembling hollow fiber assembly is difficult. (3) Japanese Patent Publication No. 5153/1975 provides a method for forming a layer of hollow fiber lines by winding a length of hollow fiber spirally around a hollow cylindrical member and providing a pressure-resistant resin wall at the terminal of the hollow fiber layer. This method permits easy mechanization and automation of the process for assembling the hollow fiber assembly, and is desirable. However, it has a shortcoming in that the hollow fiber assembly cannot substantially have a long length in an axial direction. Generally, the length of a piece of hollow fiber between its open ends is restricted by the pressure loss of the fluid which flows in the flow route inside the hollow fibers. For example, in the case of a reverse osmosis, an extension of the length of a hollow fiber beyond a certain limit may scarcely contribute to the permeation capacity of the hollow fiber. Since the apparatus of Japanese Patent Publication No. 5153/1975 has a construction to wind a length of hollow fiber spirally around a hollow cylindrical member in a multiplicity of times, when the length of a piece of hollow fiber is limited, the length of the hollow fiber assembly in an axial direction is inevitably shortened. Under such a construction, in order to serve a large capacity treating plant, a number of small scale apparatuses have to be connected one another by piping, which is not economical.

Besides, U.S. Pat. No. 3,794,468 discloses a mass transfer device using a continuous hollow tubular conduit of semi-permeable membrane, but according to the invention of this U.S. patent, the hollow materials are disposed in parallel with each other and the layers of the hollow materials wound on the surface of a core undesirably slide during operation of the device, which results in short path of the fluid or decrease of the separation capacity.

In order to find an improved method without such defects as in the above methods, the present inventors have extensively studies on the method of arranging hollow fibers, the method of forming hollow fiber layers, and the method of molding a resin wall, and as a result, have found a method for making a hollow fiber assembly wherein the length of hollow fiber is relatively small in comparison with the length of the hollow fiber layer in an axial direction and wherein the effective membrane area is relatively large.

The present invention provides a permeation separation apparatus furnished with an assembly consisting essentially of a multiplicity of continuously hollow fibers which have a selective permeability to fluid, said hollow fibers being arranged on the surface of a core so as to constitute multiple layers of the hollow fiber lines wherein the hollow fibers lines are disposed in mutually and up-and downwardly intersecting relation and are crossed two or more adjacent layers, said each layer having a thickness equal to the diameter of a piece of hollow fiber, with a resin wall or resin walls provided at one terminal or at both terminals of said hollow fiber layers, each of said hollow fiber lines thrusting through at least one of said resin walls in a fluid-sealing condition to provide an opening outward, and said hollow fibers being disposed so as to satisfy the formula:

$$\pi D/10L \leq \tan B \leq 3\pi D/4L \tag{I}$$

wherein B is an angle between a line of said hollow fiber and a straight line which is parallel with the central axis of said core on the surface of a cylindrical body which includes said hollow fiber and has common central axis with said core; D is a diameter of said cylindrical body; and L is a length of said hollow fiber layer in an axial direction.

In the permeation separation apparatus of the present invention, the hollow fiber lines are disposed on the surface of the cylindrical body of the core without being circumferentially spirally wound, and hence, the length of the hollow fiber lines between the terminals of the hollow fiber layers is nearly equal to the length of the hollow fiber layer between its terminals. In other words, where a hollow fiber is provided with open ends at both terminals of the layers, the length of the hollow fiber lines between its open ends is nearly equal to the axial directional length of the hollow fiber layer, and where a hollow fiber is provided with open end at one terminal of the layers, the length of the hollow fiber lines between its both ends is nearly equal to double of the axial directional length of the hollow fiber layer. Thus, since the apparatus of the present invention can permit disposition of the portion of the hollow fiber between its both ends in relatively a short length, there is no need to provide a limitation to the axial directional length of the hollow fiber layer in order to reduce the pressure loss of the fluid flowing through the flow route inside the hollow fiber. Thus, it is possible to make a hollow fiber assembly having a sufficient length in the axial direction. The permeation separation apparatus is constructed by accommodating the above hollow fiber assembly in a case. The apparatus of the present invention, having a hollow fiber assembly of a sufficiently long length with a large treating capacity, possesses an advantage in its possibility to reduce the cost of apparatus per fluid treating capacity.

Generally, a fluid separation plant is constructed by connecting by piping a multiplicity of permeation separation apparatuses. Since the permeation separation apparatus of the present invention can have a large treating capacity per unit, the number of the permeation separation apparatuses to constitute a separation plant may be reduced in practical use, with the consequential saving of installation cost in respect to piping, joints, meters, and the like, which is one of the most important advantages of the present invention.

In the hollow fiber assembly of the present invention, hollow fiber lines are disposed in mutually and up-and downwardly intersecting relation to constitute multiple layers of hollow fibers and are crossed two or more adjacent layers, wherein a multiplicity of hollow fiber lines mutually hold their respective positions. Because of this construction, the assembly is free from collapse or sliding of hollow fiber layers. Also, appropriate spaces maintained between the lines of hollow fiber by their mutual intersection permit realization of even flow of the fluid to be treated. Where the lines of hollow fiber are arranged in a parallel relationship, contacts between the hollow fibers which may take place in the flow of fluid usually cause a decrease in the effective membrane area. However, the hollow fiber assembly of the present invention, which has a construction to cause less contacts between the lines of the hollow fibers, possesses a large effective membrane area. Besides, in the course of the start or stopping of operation of the separation apparatus or cleaning thereof, the speed of the fluid to be treated is sometimes rapidly changed or temporarily increased. In such a case, when the hollow fibers are disposed in parallel with each other in the layers as is disclosed in U.S. Pat. No. 3,794,468, it causes undesirable sliding of hollow fiber layers and separation into dense portion and sparse portion of the hollow fibers, which results in short path of the fluid or decrease of the separation capacity. According to the hollow fiber assembly of the present invention, however, since the hollow fiber lines are disposed in mutually and up- and downwardly intersecting relations in the layer having a thickness equal to the diameter of a piece of hollow fiber and each hollow fiber line is crossed two or more adjacent layers, a multiplicity of hollow fiber lines mutually hold their respective positions, and hence, the initial capacity of the hollow fiber assembly is maintained without sliding of the hollow fiber layers in the course of the start or stopping of operation of the separation apparatus or cleaning thereof, which is also one of the advantages of the present invention.

The angle of intersection between the lines of the hollow fibers on the surface of the core is preferably not more than 60 degrees, more preferably in the range of from 5 to 30 degrees, while it depends on the thickness of the hollow fiber layer. A too small angle of intersection may cause mutual contact of the intersecting lines of hollow fibers and narrow the effective membrane area. On the other hand, when the angle of intersection between the lines of hollow fibers is too large, the packed density of the hollow fibers is reduced to lessen the membrane area per unit volume of the permeation separation apparatus. Thus, the angle of intersection between the lines of hollow fiber should have suitable range. Where, as in Japanese Patent Publication No. 5153/1975, a length of hollow fiber is spirally wound around the core, a narrowing of the angle of intersection between the lines of hollow fiber inevitably results in an undesirable long length of the hollow fiber wound on the core. To the contrary, the construction of the present invention has an advantage that the length of the portion of hollow fiber disposed on the core does not become so long as in the case of the spiral winding, even if the angle of intersection between the lines of hollow fibers is made relatively small. Each line of hollow fiber is disposed in mutually and up- and downwardly intersecting relation with the other to form a multiplicity of layers, with moderate spaces retained between the lines. In this case, it is desirable for the hollow fiber layers to be built in at least 5 layers, preferably in 10 or more layers.

The hollow fiber to be used in the present invention preferably has a high permeability of the fluid to be treated, but if the permeability is too high, the pressure within the hollow fiber is increased due to the fluid permeated therein to result in decrease of the pressure difference between outside and inside of the hollow fiber membrane, by which the amount of permeate is undesirably decreased. This decrease of permeability is more remarkable when the diameter of hollow fiber is smaller. In the permeation separation apparatus of the present invention, it is preferable to use the hollow fiber satisfying the following ratio of the diameter of hollow fiber to the permeation amount (permeability value: c/d):

$$c/d = 0.1 - 5.0$$

wherein c is an amount of water (liter/square meter/day) which permeates the membrane wall of hollow fiber when 0.2% by weight of aqueous sodium chloride solution is contacted with outside of hollow fiber at 25° C. under 30 kg/cm$^2$G and d is an outside diameter (micron) of hollow fiber. When the value of c/d is smaller than 0.1, even if a hollow fiber is formed from a semi-transparent membrane, the effective membrane area can not be sufficiently enlarged, and hence, the diameter (d) should be further reduced in order to increase the permeation amount. On the other hand, when the value of c/d is larger than 5.0, it is impossible to exhibit the sufficient permeation amount corresponding to the permeation capacity of the membrane material. The hollow fiber useful in the present invention has an outside diameter of from 10 to 1,000 microns, preferably from 100 to 500 microns, a hollow percentage of from 3 to 80%, and its membrane wall has a selective permeability to fluid. Preferred hollow fiber has an outside diameter of from 100 to 500 microns, a permeability value (c/d) of 0.1 to 5.0 and a packed density of hollow fibers in hollow fiber layer of 0.35 to 0.80. In one embodiment, the packed density may be in the range of 0.50 to 0.80. This packed density may also be defined by volume fraction which is shown by the percentage of the volume of the hollow fibers to the volume of the layer formed by the hollow fibers on the surface of the core, whereby the volume fraction is in the range of 35 to 80, in one embodiment, in the range of 50 to 80.

The membrane wall of the hollow fiber may be any type of isotropic, microporous, or asymmetric. The spinning method thereof may be any one of melt spinning, wet spinning, dry spinning or a combination of them.

The materials to constitute the hollow fiber may include cellulosic polymers (e.g. cellulose acetate, hydroxyethyl cellulose, cyanoethyl cellulose, regenerated cellulose), vinyl polymers (e.g. polyvinyl alcohol, polyvinyl acetal, polyacrylonitrile, polyacrylic ester, polyethylene, polypropylene, polystyrene, polyvinyl chloride, polytetrafluoroethylene), polyamides (e.g. high molecular weight electrolyte complex of polystyrene sulfonic acid-polyvinyl benzyltrimethyl ammonium, poly-L-glutamate, nylon 4, nylon 6, nylon 66, polydimethylpiperazine fumaramide, polydimethyl piperazine isophthalamide, polydimethyl piperazine terephthalamide, polyparaxylylene adipamide, polyparaxylylene isophthalamide, polyparaxylylene terephthalamide, poly-m-phenylene isophthalamide, polyparaphenylene terephthalamide), polyhydrazide, polyamide hydrazide, polybenzimidazole, polyimidazopyrrolone, polycarbonate, polyphenylene oxide, polysulfone, polyethylene terephthalate, polybutylene terephthalate, silicone resin or collagen.

The core to be used in the present invention is preferably a hollow cylindrical tube. It may not necessarily be cylindrical but may be square columnar shape.

Suitable examples of the core for use as a dispersing tube or a collecting tube of the liquid to be treated are a porous sintered metal tube, a porous plastic tube, a plastic tube provided with a multiplicity of holes, a metal tube having slits in an axial direction, a fiber tube made by knitting fibers, a mesh cylinder formed by filamentary material, and the like.

Where there is no need to use the core as either a dispersing tube or a collecting tube, a non-porous ordinary hollow tube or a non-hollow bar-like material may be used. Alternatively, a branched columnar body having for example a shape of cross in its section may be used to lead the liquid to be treated into the space composed of the branched section and the hollow fiber layers.

In the present invention, the resin to form a resin layer should desirably have such properties that, while it is in liquid state having fluidity before curing, it is hardened by curing to become a hard solid. Typical examples of such resins are epoxy resin, silicone resin, polyurethane resin, unsaturated polyester resin, and polyester acrylate resin.

The hollow fiber assembly of the present invention is composed by arranging the lines of the hollow fiber on the surface of a core in such a manner that the hollow fiber is transversely led over both lateral surfaces of the cylindrical body composed of the core and the hollow fiber which has transversally passed one lateral surface of the cylindrical tube is brought to the other end of the core over its longitudinal surface without intersecting the generating line (herein specifically meant to be a linear line parallel to the axial line of the core) extended over the longitudinal surface of the core through the point on the periphery of the core at which the hollow fiber is bent to be led from the lateral surface to the longitudinal surface. In this case, the angle B between the hollow fiber disposed on the longitudinal surface of the core and the generating line which passes through the point at which the hollow fiber is bent to be led from the lateral surface of the core should be in the range of $\pi D/10L \leq \tan B \leq 3\pi D/4L$. The method for the hollow fiber to be led transversely over a lateral surface of the core may be such that the hollow fiber which has passed the longitudinal surface of the core is bent at the edge of the contact of the longitudinal surface with the lateral surface, led linearly over the lateral surface and again bent at the other edge, or alternatively that, with a central shaft protruded from both ends of the cylindrical body, the hollow fiber which has transversally passed the longitudinal surface of the core is led over the lateral surface via said central shaft in such a manner that the portion of the fiber outgoing from the central shaft forms an angel not exceeding 180 degrees with the portion of the fiber coming into the central shaft, and led again to the longitudinal surface of the core.

In the present invention, arrangement of the hollow fiber on the core need not necessarily be made step by step by using each single hollow fiber, but may be made by using multiple hollow fibers at one time.

It is one of the characteristics of the present invention that the hollow fiber assembly can be manufactured by an extremely compact and simple apparatus. That is, it can be manufactured by a compact assembly apparatus basically comprising a core rotating mechanism and a hollow fiber traversing mechanism. This apparatus shows a particular advantage in maufacturing a hollow fiber assembly which has a long length in an axial direction. The system of the present invention can afford easy mechanization and automation of assembly process, and also provide a possibility to connect the process for assembling a hollow fiber assembly direct with the process for hollow fiber spinning or membrane making process.

A permeation separation apparatus of the invention can be manufactured by arranging a continuously hollow fiber which has a selective permeability to fluid on the surface of a core in sequence in a manner to retain the shape of a columnar body, leading said hollow fiber transversely over both lateral surfaces of the columnar body composed of the core and the hollow fiber, building up on the longitudinal surface of the core a multiplicity of the hollow fiber layers in which the lines of the hollow fiber are disposed in mutually and up-and downwardly interesecting relations and are crossed two or more layers, said each layer having a thickness equal to the diameter of a price of hollow fiber, providing a wall or walls of resin at one terminal or both terminals of said hollow fiber layers, and processing the assembly in such a manner that the pieces of the hollow fiber open outward thrusting through the resin wall or walls in a fluid-sealing condition.

A more complete understanding of the nature and the objects of the invention is afforded by reference to the accompanying drawings in connection with the following description in which:

FIG. 1 and FIG. 2 show typical examples of the method of arranging the hollow fiber on the core in accordance with the present process.

Referring to FIG. 1, a core 1, having central shafts 2, 3 at both ends, is rotated in the arrow-marked direction, to which a hollow fiber 7 is supplied from a bovin (not shown) through a guide member of a traverser 10 which traverses in parallel with the axial direction of the core 1. The hollow fiber 7, led over a lateral surface 4 of the core 1, comes over the longitudinal surface through a point 6 and is brought to the other end of the core without intersecting the generating line 8 extended through the point 6, and then led to the other lateral surface 5 through a point 9.

FIG. 2 shows the condition of arrangement of the hollow fiber at the time when the traverser 10 is shifted to the side of the other end a short time after the state illustrated in FIG. 1. In FIG. 2, the hollow fiber 7 comes into the lateral surface 5 of the core through a point 9, and passes the lateral surface 5 via a central shaft 2 to come to a point 11, through which it is led over the longitudinal surface to the lateral surface 4 of the other end without intersecting the generating line 12 extended through the point 11, and is led over the lateral surface 4 through a point 13.

As will be apparent from FIG. 1 and FIG. 2, by regulating the rotation speed of the core 1 and the traversing speed of the traverser 10, it is possible to change the condition of arrangement of the hollow fiber, particularly the angle to be formed between the generating line on the core and the hollow fiber.

FIG. 3 shows another method for arranging the hollow fiber on a core. In this example, the rotation of a core 14 is made by surface transmission of the rotation of another rotary cylindrical body 15 which has a driving shaft 16. The hollow fiber 17 is supplied through a guide member of a traverser 18 which traverses in parallel with the central axis of the core 14. In this case, the hollow fiber 17 is led in a linear manner over the lateral surface of the core 14 and arranged on the longitudinal surface of the core 14. At the time when the layers of the hollow fiber 17 have not yet sufficiently been formed on the surface of the core 14, the hollow fiber 17 may be apt to slip at the periphery of the core 14, in which case the lateral surface of the core 14 may be provided with a slip-proof finishing, of the hollow fiber may be secured with a tape-shaped porous spacer.

Alternatively, the permeation separation apparatus of the present invention may be manufactured by arranging a continuously hollow fiber which has a selective permeability to fluid on the surface of a core in sequence in a manner to retain the shape of a columnar body and also in a manner of being turned back on the longitudinal surface at one terminal of said columnar body to reach the other terminal without making a complete helical coil around the columnar body in its circumferential direction, building up the layer of hollow fiber in which the lines of the hollow fiber are disposed in mutually and up- and downwardly intersecting relations and are crossed two or more layers, providing a wall or walls of resin at one terminal or both terminals of said hollow fiber layers, and processing the assembly in such a manner that the pieces of the hollow fiber open outward thrusting through the resin wall or walls in a fluid-sealing condition.

When the hollow fibers are arranged in a manner as shown in FIG. 1 to 3, the hollow fibers are intersected on the lateral surface at both terminals of the core and are piled up too largely, and hence, when the formed hollow fiber layers have a large thickness over a fixed thickness, it results in collapse of hollow fiber layers. Thus, according to the method as shown in FIG. 1 to 3, there can not be produced a hollow fiber assembly having a large thickness of hollow fiber layers. On the other hand, according to the alternative method mentioned above, the hollow fibers do not intersect on the lateral surface at the terminals of the core, and hence, the thickness of hollow fiber layers can be fairly enlarged. Moreover, when resin wall or walls are provided at one terminal or both terminals of the hollow fiber layers formed as shown in FIG. 1 to 3, the hollow fiber layers intersecting at the terminals are uselessly embedded into the resin wall or walls, but on the contrary, according to the alternative method, the hollow fibers are utilized as the hollow fiber layer at maximum without such waste.

By the way, according to the above-mentioned alternative method of the present invention, a continuously hollow fibers are arranged in sequence around the core in a manner to retain the shape of a columnar body, and yet in a manner that the hollow fiber is turned back on the longitudinal surface at one terminal of the columnar body to reach the other terminal without making a complete helical coil around the columnar body in its circumferential direction. Since the hollow fiber is arranged in a manner of traversing between the terminals of the columnar body without making a complete helical coil around the columnar body, there is a necessity to provide a means of fixing the hollow fiber to the core at the terminal portion.

FIG. 4 shows an embodiment of the method for arranging the hollow fiber according to the above alternative method. A core 21 is rotated in the direction indicated by an arrow mark. A guide member 25 is traversed nearly between both ends of the core 21 and closely to the core 21. A hollow fiber 22 is supplied onto the longitudinal surface of the core 21 through a guide member 25. On the other hand, threads 23, 24 are supplied through guide members 26, 27 in the vicinity of the ends of the core 21. The threads 23 and 24 are wrapped up in the layers of fibers formed on the core 21 while holding down and fixing the turned portions of the hollow fibers 22 onto the surface of the core 21 in the vicinity of both ends thereof. That is, according to the method shown in FIG. 4, the hollow fibers are arranged as follows.

The hollow fibers 22 supplied from the guide member 25 are firstly held down and fixed with the thread 23 supplied from the guide member 26 at one end of the rotating core 21, and then are extended to another end of the core 21 with satisfying the conditions as defined by the above formula (I), at which end the hollow fibers are held down and fixed with the thread 24 supplied from the guide member 27, and then, the hollow fibers are turned back to the first end of the core 21 with satisfying the conditions of the formula (I) likewise, at which the hollow fibers are again held down and fixed with the thread 23 while overlapping the thread 23 used previously for holding down and fixing the hollow fibers 22. By repeating this procedure, the layers of hollow fibers are formed, whereby the threads 23 and 24 used for holding down and fixing the hollow fibers 22 at both ends of the core 21 are wrapped up in the layers. In this method, the hollow fibers running between both ends of the core are always held down and fixed with the threads just one time per one running at each end. When tan B in the formula (I) is larger than the upper limit of the formula (I), the hollow fibers are excessively held down with the threads, which causes not only waste of threads but also too large thickness of the layers at the ends, and hence, the desired fiber assembly having an enough packed density is hardly obtainable. When the turned points of the hollow fibers are little by little shifted in the vicinity of the ends of the core, too large pile of the turned hollow fibers can be prevented.

Figure 5:
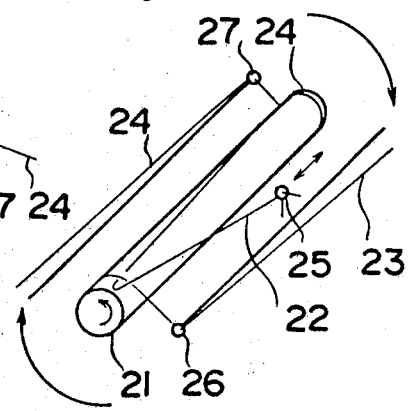

FIG. 5 shows another embodiment of the method for arranging the hollow fiber. This method has a proximity to the method of FIG. 1 but differs therefrom in the point that the hollow fiber is arranged in a manner of being hooked on the thread. This system is so contrived that the threads 23, 24 cross the hollow fiber 22 by rotating the guide members 26, 27 of the threads 23, 24 around the core 21 at the time when the guide member 25 of the hollow fiber 22 is positioned in the vicinity of the ends of the core 21.

The threads used in the methods as shown in FIG. 4 and 5 include filaments, twisted yarns, spun yarns, elastic yarns, or the like. Besides, instead of threads, there may be used a tape. The threads and tapes are preferably fine or thin, so that when they are used, they do not become bulky.

Figure 6:
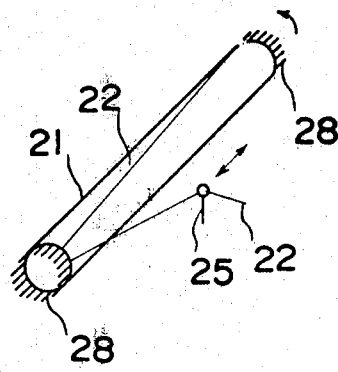
Figure 7:
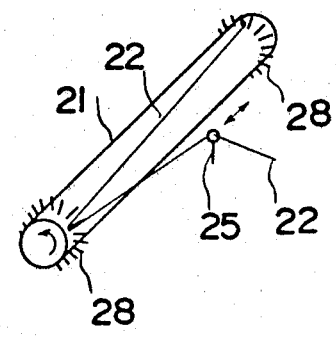

FIG. 6 and FIG. 7 show another embodiments of the method for arranging the hollow fiber. In case of these examples, the core 21 is provided with a multiplicity of projections 28, on which the hollow fiber 22, supplied through the guide member 25 which traverses nearly between the ends of the core 21, is hooked on a projection 28, turned back, and arranged on the longitudinal surface of the core 21. The hollow fiber 22 may be turned back after being hooked on a single projection 28, or turned back via the two projections 28 provided at a distance in the circumferential direction.

Figure 8:
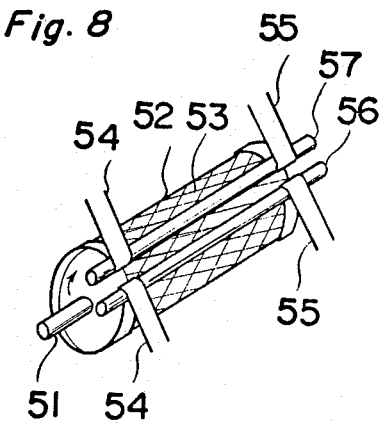
Figure 9:
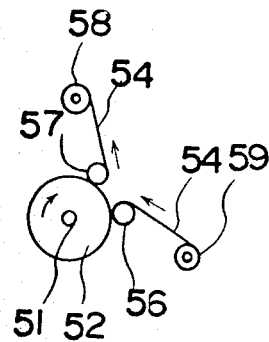

FIG. 8 is a perspective view to show a modified embodiment of the present invention, and FIG. 9 is a view to show the cross-section thereof in a simplified form.

Referring to these FIGS. 8 and 9, fiber lines 53 are disposed around a core 51 to constitute a fiber assembly 52, which is rotated under the condition where the terminals thereof are held by belts 54, 55. The belts 54, 55, supplied from belt rolls 59, are advanced through a guide roller 56 while pressing the fiber assembly, and taken up through a guide roller 57 on belt rolls 58. The fiber line 53 are arranged in the space defined between guide rollers 56, 57 through a traverse guide (not shown) which traverses between the distance on the position corresponding to the said space. By this provision, the newly arranged fiber line 53 is held by the belts 54, 55 before it is turned back at the terminal, so that an assembly of fiber whose lines are accurately arranged without sliding at the terminals is obtainable. The belts having a width of 30 to 100 mm can give a sufficient effect for holding down the hollow fibers, but there may be used a belt having a width extending whole length in the axial direction of the core, or there may be used two or more belts at each end.

Thus, according to the method as shown in FIG. 8 and 9, the hollow fibers are arranged as follows.

The belts 54 and 55 are supplied through two guide rolls 56 and 57 and are closely surrounding the surface of the rotating core 51 wholly or in the vicinity of both ends of the core with remaining a space for supplying the hollow fibers between the rolls 56 and 57 while supplying the hollow fibers through the space between the rolls 56 and 57, said hollow fibers being traversing the distance of both ends of the core and turning back at each end thereof, said belts moving on the surface of the core in unison with the rotation of the core and holding down the turned portions of the hollow fibers and also the formed fiber assembly (fiber layers) 52. The method of holding down the hollow fibers with belts as shown in FIG. 8 and 9 may be combined with the method as shown in FIG. 4.

According to the method of the present invention, in the process of arranging the lines of fiber around the core no sliding phenomenon at the terminal portions occurs, because of which it is possible to produce an assembly of fiber wherein the lines of fiber are accurately arranged without collapse of the wound figure. It is also possible to produce a tight package of fiber having a high packed density of fiber lines without an excessive tension given to the fiber lines. Further, the method of the present invention permits production by a simple device of a fiber package having such arrangement that a line of fiber is turned back at the terminals and traversed between the terminals.

Generally, a hollow fiber which has a selective permeability to fluid is liable to sustain damage by excessive friction, tension, and pressure. When a hollow fiber sustains damage, the said fiber shows a lower selective permeation performance. The method of the present invention has an advantage in that the hollow fiber sustains less damage, because a hollow fiber assembly is constituted by arranging the lines of hollow fiber direct on the core. It may be possible to employ a method of first forming a sheet-like layer of hollow fiber and then coiling the formed sheet-like hollow fiber layer around the core to constitute a hollow fiber assembly, but the said method has a defect in that, because of the two steps required for processing, the hollow fiber is apt to sustain damage.

The method of the present invention has another advantage that, because the hollow fiber assembly is constituted by arranging the hollow fibers direct on the core, strict control of the condition of arrangement of the hollow fiber lines in the hollow fiber assembly is possible. When the hollow fiber lines are arranged at random, the packed density of the hollow fibers in the hollow fiber layer is small, which provides a small membrane area per unit volume of the apparatus. It is therefore important to arrange the hollow fiber lines in a very good order.

The method of the present invention can give a hollow fiber assembly having a sufficiently large packed density without giving a large tension or friction, and hence, the permeation separation apparatus of the present invention shows a high separation rate without decreasing the separation capacity of the hollow fibers and further has a large permeation amount per unit volume of the apparatus. Moreover, since the hollow fibers are tightly held in the assembly and the hollow fiber layers do not slide, the apparatus shows stable separation capacity for a long period of time.

According to the method of first forming a sheet-like layer of hollow fiber and then coiling the formed layer around the core, a sliding of the hollow fiber lines takes place in the coiling stage to cause irregularities to the arrangement of the hollow fiber lines in the hollow fiber assembly, so that the packed density of the hollow fiber lines in the hollow fiber layer cannot be made larger than a certain limit.

According to the method of the present invention, because a hollow fiber assembly is constituted by arranging the hollow fibers direct on the core, it is possible to obtain a hollow fiber assembly having the hollow fiber layers in which the hollow fiber lines are arranged in a good order and with a high packed density.

In the hollow fiber assembly produced by the present invention, the hollow fibers are uniformly arranged, and hence, the flowing of the fluid which flows outside the hollow fibers is smooth and no channelling occurs, and furthermore, since it has no dead space, no extraneous retention of fluid occurs. Accordingly, when fluid is treated by the present permeation separation apparatus furnished with the hollow fiber assembly, the fluid is separated in a high separation rate. The present apparatus has also an advantage that it has no trouble owing to deposition of fine particles contained in the fluid and precipitation of the components dissolved in the fluid, because of no extraneous retention of fluid.

Moreover, the conventional apparatuses have a defect that undesirable sliding of hollow fiber layers occurs due to the rapid change of the fluid flowing at the initial of operation of the apparatus or the pulsating flowing of fluid by pumping, which induces heterogeneous flowing of fluid and then results in decrease of separation efficiency. On the contrary, according to the hollow fiber assembly of the present invention, the hollow fibers are accurately arranged in mutually and up- and downwardly intersecting relations in the layers, and hence, no sliding or collapse of the hollow fiber layers occurs and the high separation efficiency of the assembly can be maintained.

In the present invention, the hollow fiber lines are also arranged in such a manner that the angle B formed between the hollow fiber and the straight line (i.e. the generating line) parallel to the central axis of the core comes within the range shown in the formula (I). If the angle B is too large, the length between the open ends of a hollow fiber is extended and the curvature of the hollow fiber is enlarged in the hollow fiber assembly, giving rise to a large pressure loss of the fluid to be passed through the flow route in the hollow fiber. Reversely, if the angle B is too small, the intersecting lines of the hollow fiber come to be in nearly parallel arrangement and occupy a large area of mutual contact, by which the effective membrane area is narrowed, and the position of the hollow fiber is apt to shift against the flow of the fluid to be treated to cause a short path to the flow of the fluid to be treated.

Figure 10:
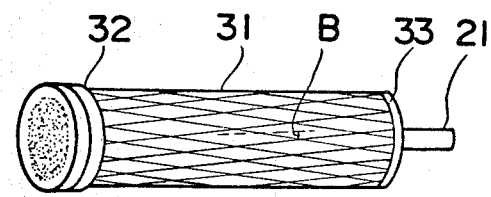

FIG. 10 is a perspective view showing a preferred embodiment of the hollow fiber assembly of the present invention. In the figure, a hollow fiber assembly is constructed first by arranging the hollow fiber lines around a core 21 in a manner shown in FIG. 4 to form columnar hollow fiber layers 31, injecting a liquid resin into both terminals of the hollow fiber layers, curing and molding it to form resin walls 32, 33 which internally contain the hollow fibers, and further cutting the resin wall 32 at one terminal nearly vertically to the core 21 to form an open end of the hollow fiber.

Figure 11:
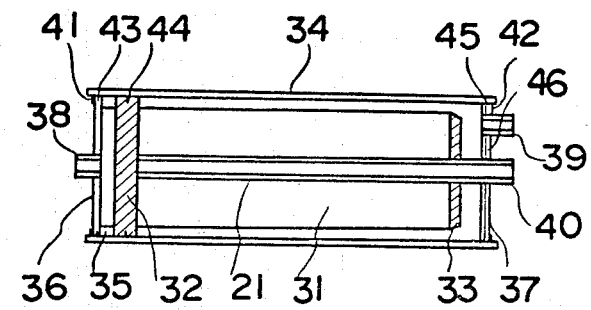

FIG. 11 shows a cross-sectional view of the permeation separation apparatus which contains in a case a hollow fiber assembly shown in FIG. 10. In FIG. 11, a hollow fiber assembly, composed of a hollow fiber layer 31, a core tube 21 which has a slit-like opening on its portion of contact with the hollow fiber layers 31, and resin walls 32, 33, is contained in a cylindrical case 34. On the side of the resin wall 32 there is disposed a side plate 36 mediated by an annular member 35. On the side of the resin wall 33 there is disposed a side plate 37. The side plate 36 is provided with a fluid passage 38 which is led to the inside of the hollow fiber, and the side plate 37 is provided with fluid passages 39, 40 led to the exterior of the hollow fiber. The side plates 36, 37 are supported by snap rings 41, 42 provided inside the case 34. As the means to seal the fluid, elastic rings 43, 44, 45 and 46 are provided.

Illustrating the case of applying the permeation separation apparatus shown in FIG. 11 to the reverse osmosis process, the fluid to be treated fed to the fluid passage 40 flows in the core 21, passes the slit, and flows into the hollow fiber layers 31. During the passage of the fluid to be treated through the hollow fiber layers 31, a part of the fluid to be treated permeates through the membrane walls of the hollow fiber, and the permeated fluid comes to the open end outside the resin wall 32 through the flow route in the hollow fiber and flows out from the fluid passage 38 through the chamber formed by the annular member 35. On the other hand, the fluid to be treated, which has passed the hollow fiber layer 31 without permeating through the membrane wall of the hollow fiber, is taken out from the fluid passage 39.

Examples of the practical uses of the permeation separation apparatus of the present invention are the separation operations such as gas permeation (e.g. recovery of helium, refining of hydrogen, and artificial lung), liquid permeation (e.g. separation of paraxylene from the mixed xylene), dialysis (e.g. artificial kidney), ultrafiltration (e.g. refining of enzyme, separation of oil from water, and recovery of coating composition from the waste water of electrocoating), reverse osmosis process (e.g. desalinition of sea water or brackish water into fresh water, purification of waste water, recovery of useful substance from waste water, and concentration of juice).

What is claimed is:

1. A permeation separation apparatus furnished with an assembly consisting essentially of a multiplicity of continuously hollow fibers which have a selective permeability to fluid, said hollow fibers being arranged on the surface of a core so as to constitute multiple layers of the hollow fiber lines wherein the hollow fiber lines are disposed in mutually and up- and downwardly intersecting relations and are crossed two or more adjacent layers, said each layer having a thickness equal to the diameter of a piece of hollow fiber, with a resin wall provided at at least one terminal of said hollow fiber layers, each of said hollow fiber lines thrusting through at least one resin wall in a fluid-sealing condition to provide an opening outward, and said hollow fiber being disposed so as to satisfy the formula:

$$\pi D/10L \leq \tan B \leq 3\pi D/4L$$

wherein B is an angle between a line of said hollow fiber and a straight line which is parallel with the central axis of said core on the surface of a cylindrical body which includes said hollow fiber and has common central axis with said core; D is a diameter of said cylindrical body; and L is a length of said hollow fiber layer in an axial direction.

2. The apparatus according to claim 1, wherein the hollow fiber has an outside diameter of 100 to 500 microns, a permeability value: $c/d = 0.1$ to $5.0$ wherein c is an amount of water (liter/square meter/day) which permeates the membrane wall of hollow fiber when 0.2% by weight of aqueous sodium chloride solution is contacted with outside of hollow fiber at 25° C. under 30 kg/cm$^2$G and d is an outside diameter (micron) of hollow fiber, and a packed density of hollow fibers in hollow fiber layers of 0.35 to 0.80.

3. The apparatus according to claim 2, wherein the packed density of hollow fibers in hollow fiber layers is in the range of 0.50 to 0.80.

* * * * *